(12) United States Patent
Zhang et al.

(10) Patent No.: US 7,937,511 B2
(45) Date of Patent: May 3, 2011

(54) BURNING APPARATUS

(75) Inventors: Su-Shun Zhang, Shenzhen (CN); Tao Li, Shenzhen (CN); Xin-Bin Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1525 days.

(21) Appl. No.: 11/306,525

(22) Filed: Dec. 30, 2005

(65) Prior Publication Data

US 2007/0171150 A1    Jul. 26, 2007

(51) Int. Cl.
*G06F 3/00* (2006.01)
*G06F 13/12* (2006.01)
*G06F 13/38* (2006.01)

(52) U.S. Cl. .............................. 710/71; 710/9

(58) Field of Classification Search ............. 710/71, 710/9
See application file for complete search history.

(56) References Cited

U.S. PATENT DOCUMENTS

| 5,555,438 A * | 9/1996 | Blech et al. ............... 710/30 |
| 2005/0141296 A1 * | 6/2005 | Zhang ...................... 365/196 |

* cited by examiner

*Primary Examiner* — Chun-Kuan Lee
*Assistant Examiner* — Zachary K Huson
(74) *Attorney, Agent, or Firm* — Wei Te Chung (57) ABSTRACT

A burning apparatus for burning data stored in a burning machine to a chip includes: a power transforming circuit for providing a working voltage to the chip, a connector for receiving parallel burn data and control signals from the burning machine, and a data transforming circuit for transforming the parallel burn data received from the burning machine into serial data and sending the transformed serial data to the chip. The burning machine, connector, and the data transforming circuit are connected in series, thereby forming a data transfer channel for sending burn data into the chip and sending the burn data back to the burning machine after the burning process.

15 Claims, 9 Drawing Sheets

BURNING APPARATUS

FIELD OF THE INVENTION

The present invention relates to burning apparatuses, and more particularly to a burning apparatus for burning integrated circuit chips of the motherboard online.

DESCRIPTION OF RELATED ART

When manufacturing motherboards, it is needed to burn a variety of files into the EEPROM of corresponding chips. The most familiar burning process is to burn basic input/output system (BIOS) files into a BIOS chip. The computer also needs to use a network card when connected to the internet. Each network card includes a corresponding media access control address (MAC address). The MAC address is a hardware address that uniquely identifies each node of a local area network. The network can identify the computer that receives or sends information according to the MAC address.

Conventionally, the BIOS files and MAC address are respectively separately burned in the BIOS chip and the network card chip. Then, the chips are respectively mounted on the motherboard. It is time consuming and expensive to burn the chips respectively, and this process cannot burn chips already integrated in a motherboard or other printed circuit board. Furthermore, chips often miss the burning process due to errors in batch manufacturing. Additionally, the information to be burned is sent to the chips by a serial transfer means in the conventional burning process, which is less accurate and less efficient.

Accordingly, what is needed is a burning apparatus able to burn multiple chips integrated in a printed circuit board accurately and efficiently.

SUMMARY OF INVENTION

A burning apparatus for burning data stored in a burning machine to a chip includes: a power transforming circuit for providing a working voltage to the chip, a connector for receiving parallel burn data and control signals from the burning machine, and a data transforming circuit for transforming the parallel burn data received from the burning machine into serial data and sending the transformed serial data to the chip. The burning machine, the connector, and the data transforming circuit are connected in series, thereby forming a data transfer channel for sending burn data into the chip and sending the burn data back to the burning machine after the burning process.

Other objects, advantages, and novel features of the present invention will be drawn from the following detailed description of preferred embodiments of the present invention with the attached drawings, in which:

DETAILED DESCRIPTION

Figure 1:
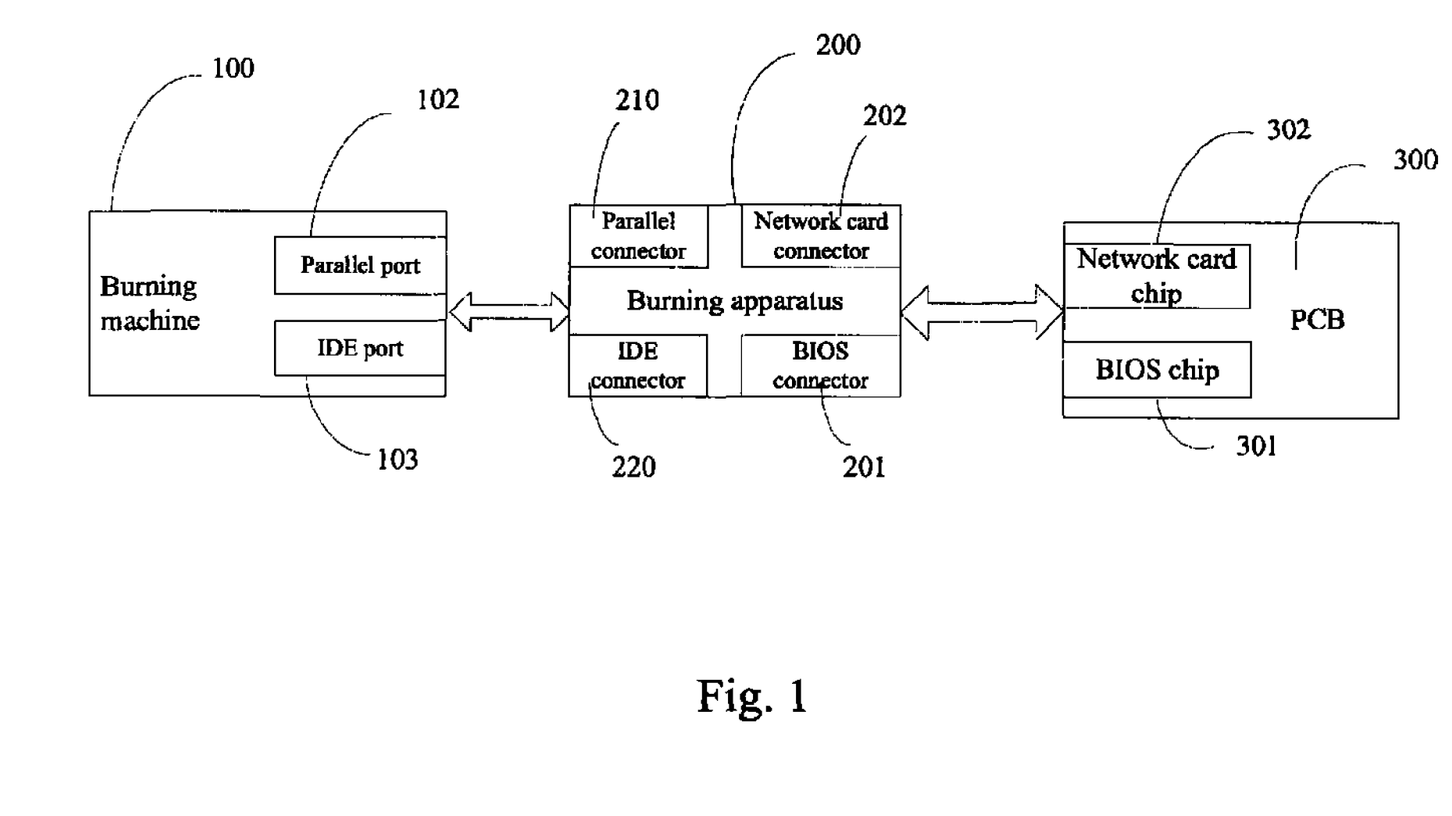
FIG. 1 is a block diagram of a working system of a burning apparatus in accordance with a preferred embodiment of the present invention.

Referring to FIG. 1, a burning system includes a burning machine 100, a burning apparatus 200, and a printed circuit board (PCB) 300 to be burned. The burning machine 100 can be a computer, which includes a burning platform for the PCB 300 disposed thereon. The burning apparatus 200 in accordance with a preferred embodiment includes a parallel connector 210 and an integrated drive electronics (IDE) connector 220, respectively connected to a parallel port 102 and an IDE port 103 of the burning machine 100, for receiving files from the burning machine 100. The burning apparatus 200 further includes a BIOS connector 201 and a network card connector 202, respectively connected to a BIOS chip 301 and a network card chip 302 of the PCB 300.

Figure 2:
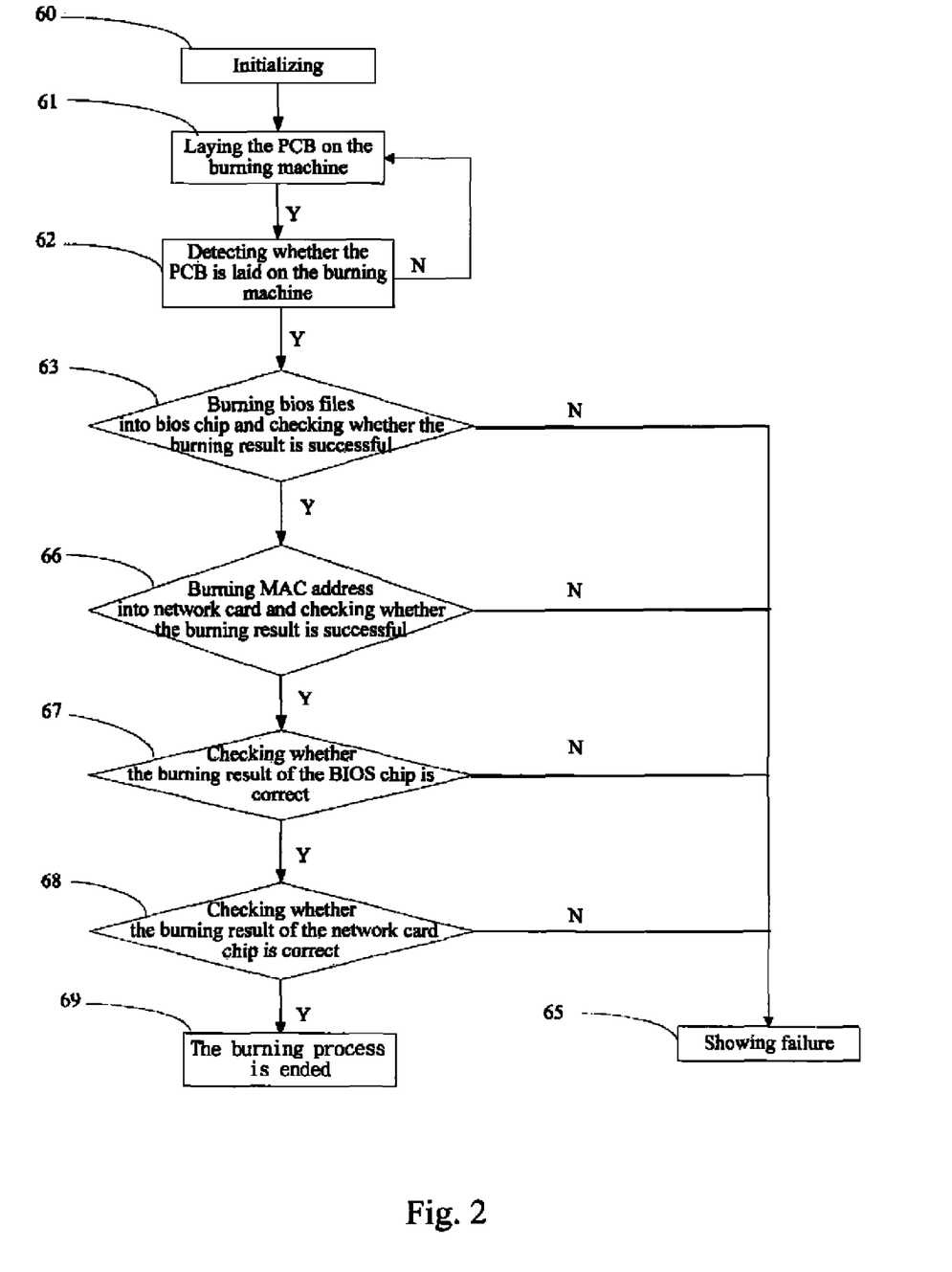
FIG. 2 is a flow chart of the burning apparatus in accordance with a preferred embodiment of the present invention.

Referring to FIG. 2, the process of burning BIOS files and MAC address includes the following steps:

Step 60: Starting up the burning machine 100. A message to lay the printed circuit board 300 is shown.

Step 61: Placing the printed circuit board 300 onto the burning platform of the burning machine 100.

Step 62: Checking whether the printed circuit board 300 is correctly placed on the platform of the burning machine 100. If yes, the process will proceed to a burning program. If no, the process will return to step 61.

Step 63: Burning the BIOS chip, and then checking whether the burning process is successful. If yes, the process will go to step 66. If no, the burning system will indicate failure of the burning process (step 65).

Step 66: Burning the MAC address into the EEPROM of the network card, and checking whether the burning process is successful. If the burning process is successful, the process will go to step 67. If no, the burning system will indicate failure of the burning process (step 65).

Step 67: Verifying whether the burning result of the BIOS chip is correct. If the burning result is correct, the process will go to step 68. If no, the burning system will indicate failure of the burning process (step 65).

Step 68: Verifying whether the burning result of the network card chip is correct. If the burning result is correct, the process will go to step 69. If no, the burning system will indicate failure of the burning process (step 65).

Step 69: The burning process is ended.

Figure 3:
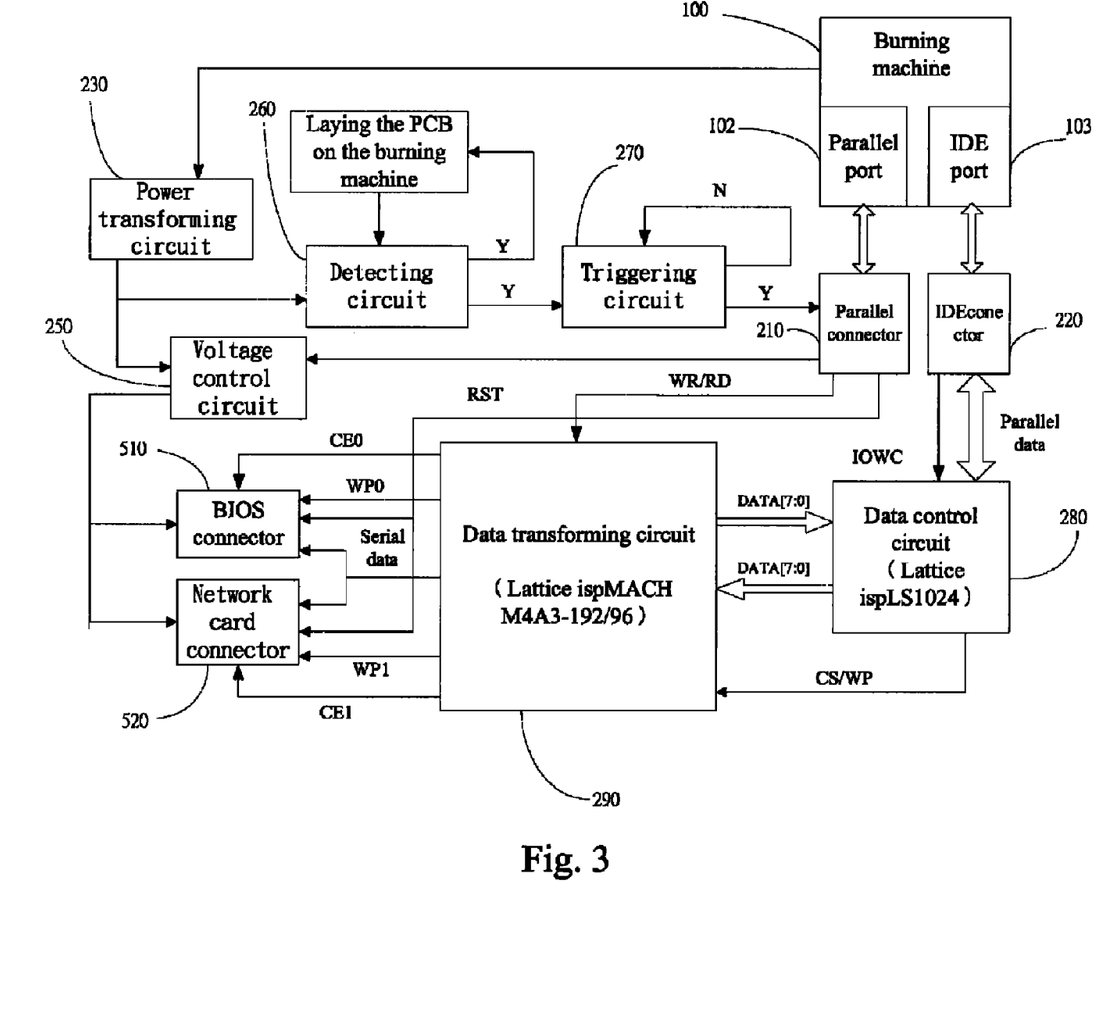
FIG. 3 is a schematic diagram of the burning apparatus in accordance with a preferred embodiment of the present invention.

Referring to FIG. 3, the burning apparatus 200 for burning BIOS files and MAC address further includes a power transforming circuit 230, a voltage control circuit 250, a detecting circuit 260, a trigger circuit 270, a data control circuit 280, and a data transforming circuit 290. The burning machine 100, the data control circuit 280, the data transforming circuit 290, and the printed circuit board 300 are serially connected, and together form a data-transfer channel. The BIOS files and MAC address existing in the burning machine 100 are transferred to the PCB 300 via the data-transfer channel. The power transforming circuit 230, the detecting circuit 260, the trigger circuit 270, and the burning machine 100 are connected serially, and together form a circuit loop, for detecting whether the PCB 300 is placed on the platform of the burning machine 100. The voltage control circuit 250, the detecting circuit 260, and the trigger circuit 270 are all connected to the power transforming circuit 230 to receive a 3.3V working voltage. The voltage control circuit 250 is simultaneously connected to the burning machine 100 and the PCB 300, for receiving control orders from the burning machine 100 to provide a 3.3V voltage to the PCB 300.

The working principle of the burning apparatus 200 is as follows: The burning machine 100 is started up. The power transforming circuit 230 receives a signal from the burning machine 100 and provides a working voltage to the detecting circuit 260. The detecting circuit 260 starts up, and checks whether the PCB 300 is placed on the platform of the burning machine 100. When the detecting circuit 260 senses the PCB 300, the trigger circuit 270 starts up and sends a signal to the voltage control circuit 250. Then, the voltage control circuit 250 sends the working voltage from the power transforming circuit 230 to the BIOS chip 301 and the network chip 302. The data control circuit 280 and the data transforming circuit 290 respectively receive a control signal from the IDE connector 220 and the parallel connector 210. The BIOS files and MAC address in the burning machine are transmitted in parallel to the data control circuit 280 via the IDE connector 220. The parallel data is transformed to serial data via the data transforming circuit 290 and sent to the BIOS connector 201 and the network card connector 202. Then, the data is written into the BIOS chip 301 and the network card chip 302. After the burning process is finished, the burning machine 100 sends a data reading signal via the parallel port 102. The BIOS files and the MAC address, which have been written into the chips, are read and sent to the burning machine 100 via the data-transferring channel for verification. If the result of the verification is wrong, the burning process will be performed again.

Figure 4:
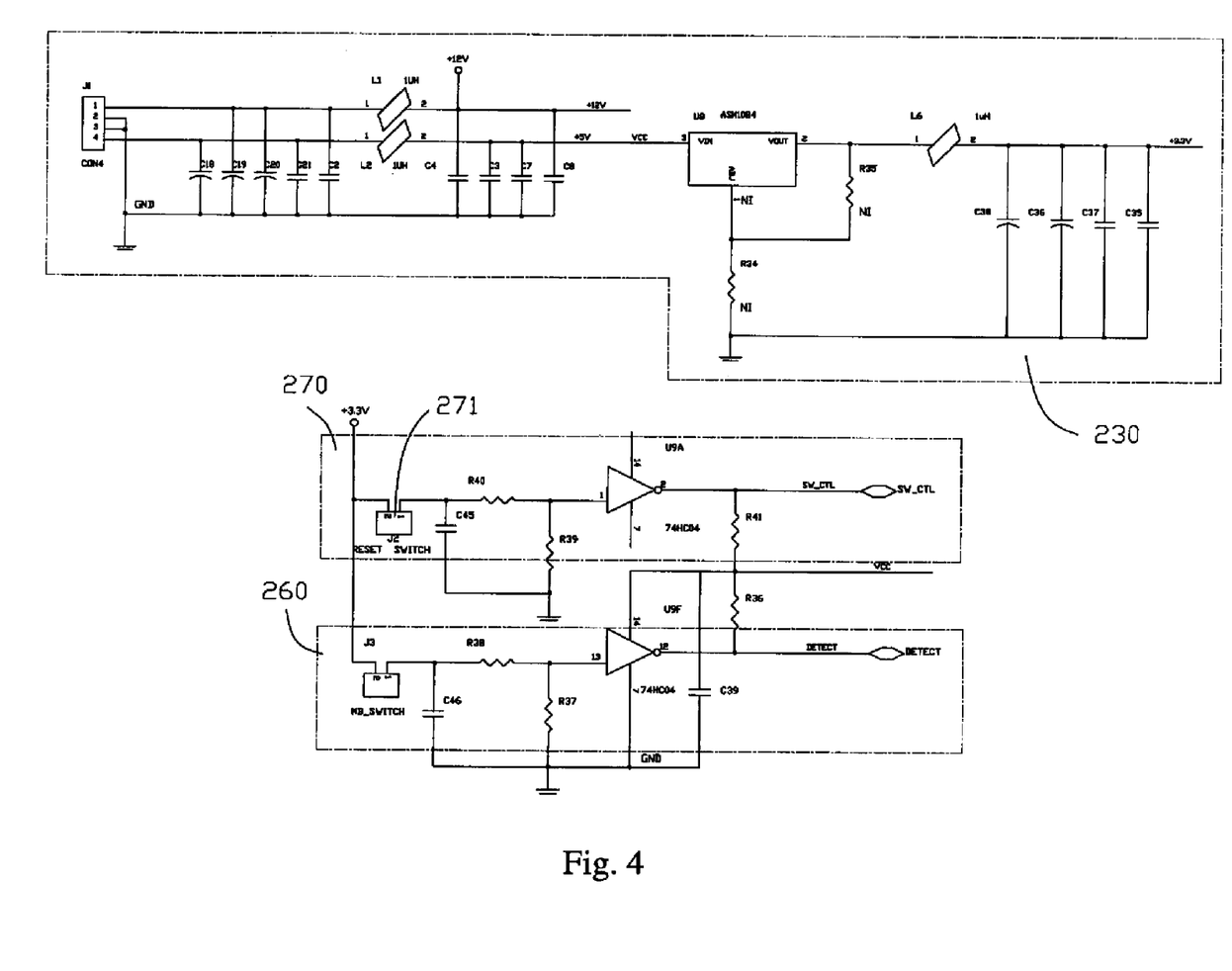
FIG. 4 is a circuit diagram of the power transforming circuit, the detecting circuit, and the trigger circuit in accordance with the present invention.
Figure 5:
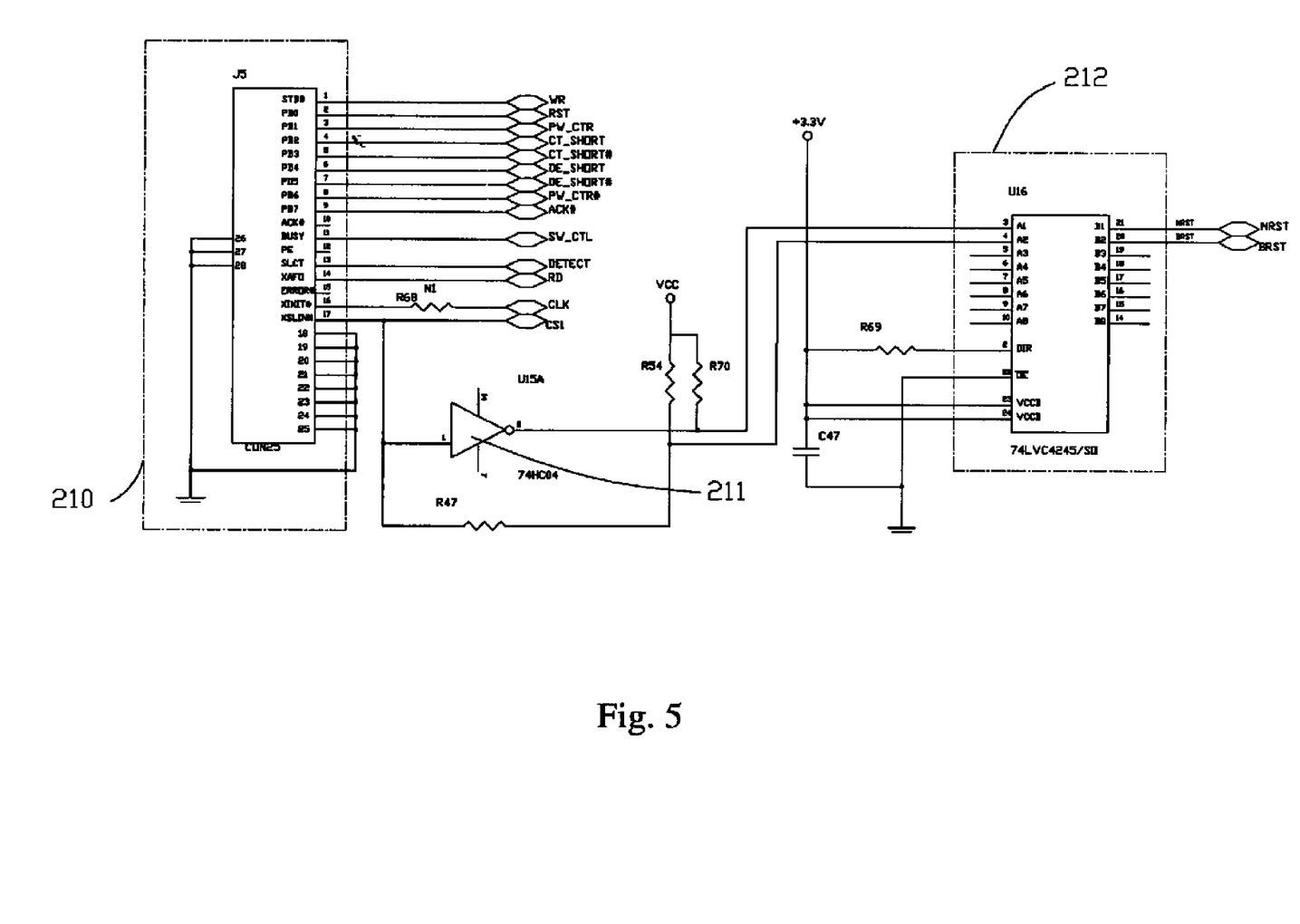
FIG. 5 is a circuit diagram of the parallel connector and the buffer in accordance with the present invention.
Figure 6:
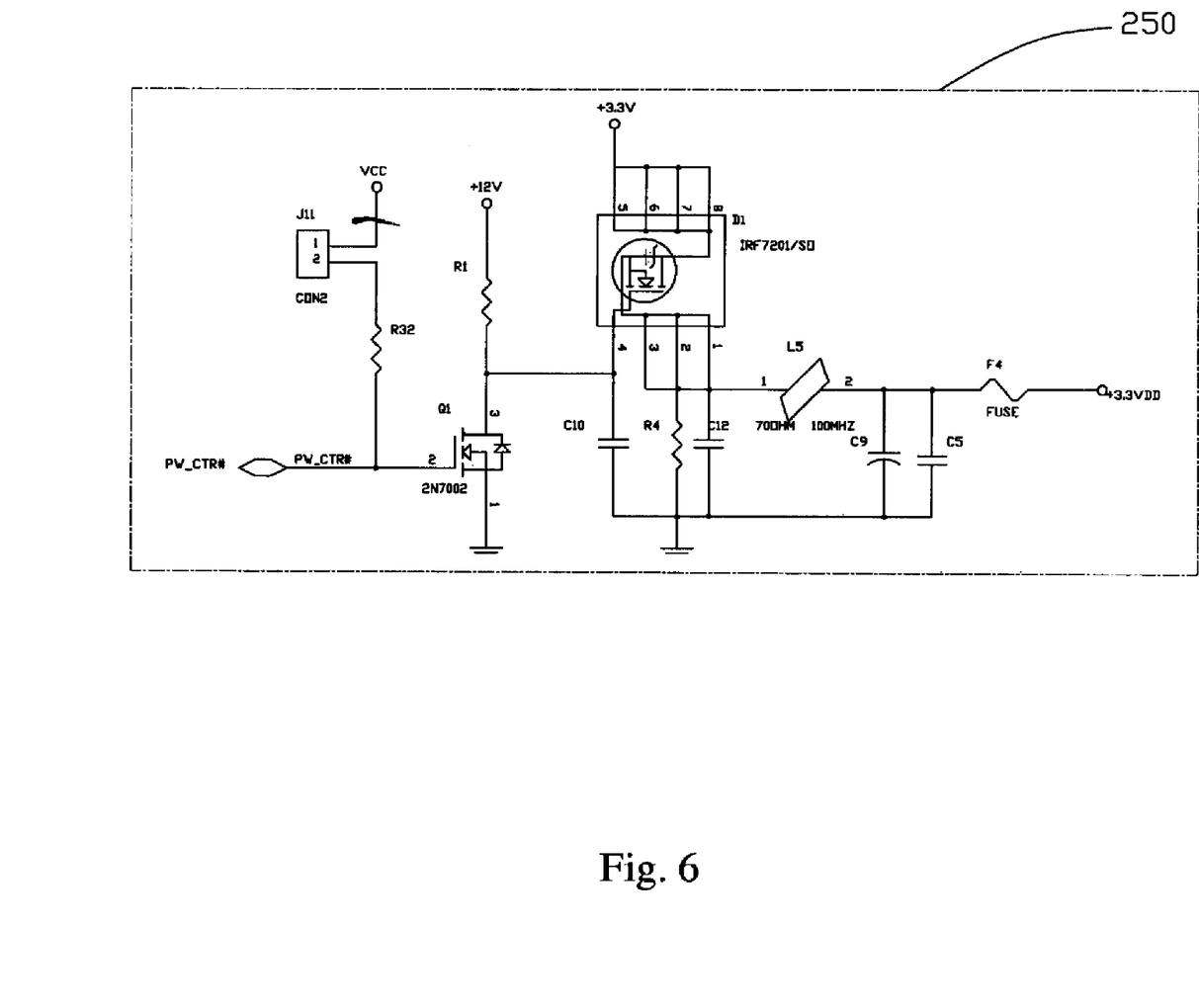
FIG. 6 is a circuit diagram of the voltage control circuit in accordance with the present invention.

Referring also to FIGS. 4 to 9, the power transforming circuit 230 is connected to the power supply of the burning machine 100, for transforming the voltage from the burning machine 100 to a 3.3V working voltage and providing the working voltage to the voltage control circuit 250, the detecting circuit 260, and the trigger circuit 270. The trigger circuit 270 includes a burning switch 271. When the detecting circuit 260 senses the PCB 300, the burning switch 271 is activated. The trigger circuit 270 sends a signal to pin 11 (SW_CTL) of the parallel connector 210, and the voltage control circuit 250 outputs a 3.3V working voltage to the BIOS chip 301 and the network card chip 302 (FIGS. 4 and 5). Then, the burning process is started.

Figure 7:
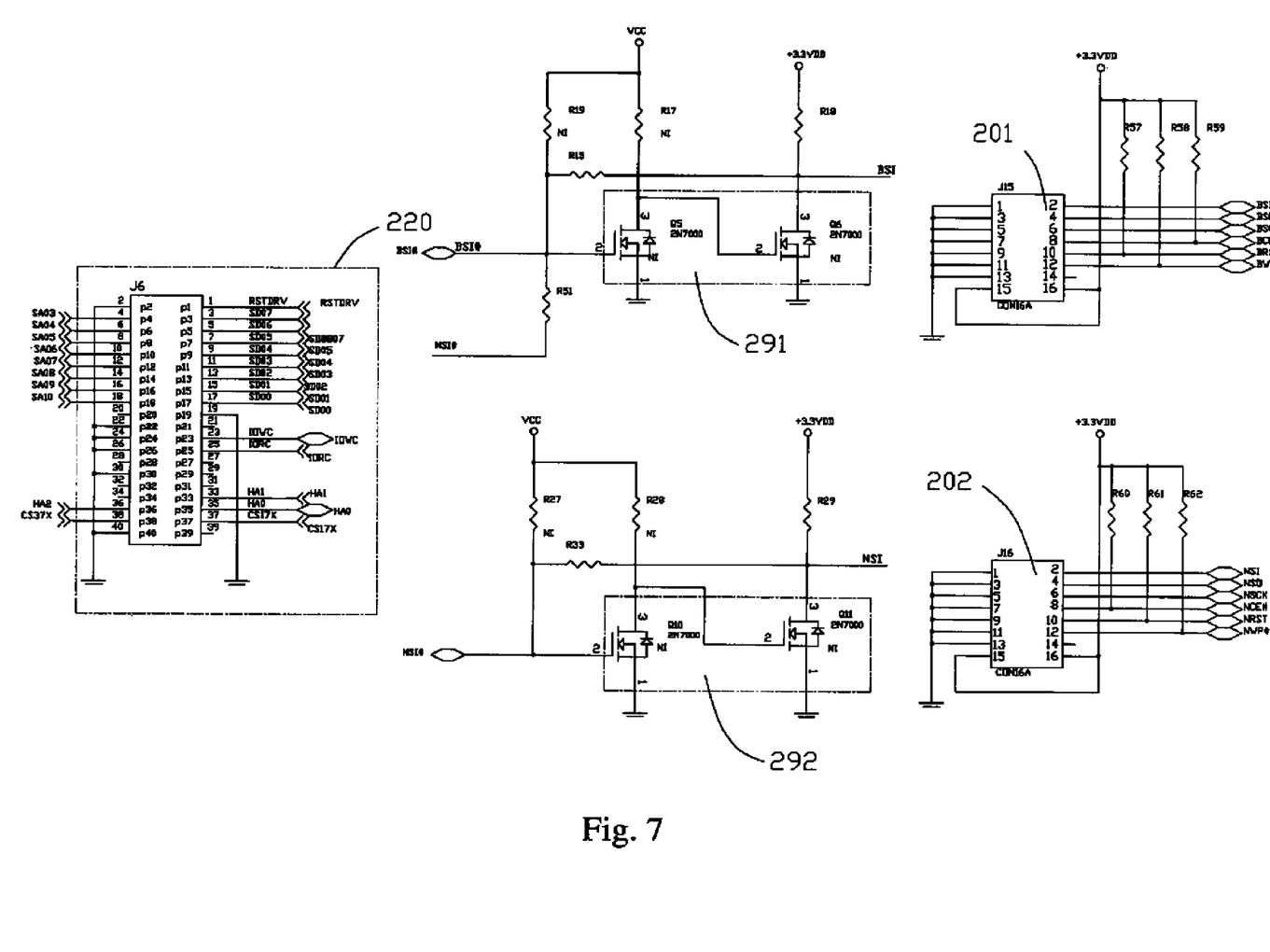
FIG. 7 is a circuit diagram of the IDE connector, the bios connector, the network card connector, and the isolation circuit in accordance with the present invention.
Figure 8:
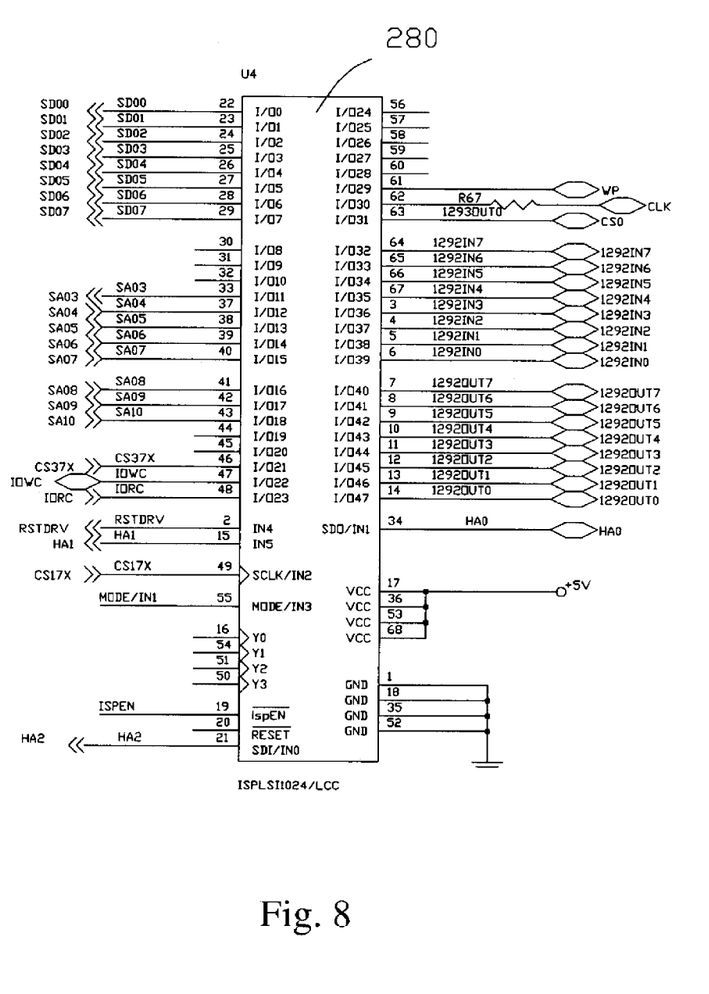
FIG. 8 is a circuit diagram of the data control circuit in accordance with the present invention.
Figure 9:
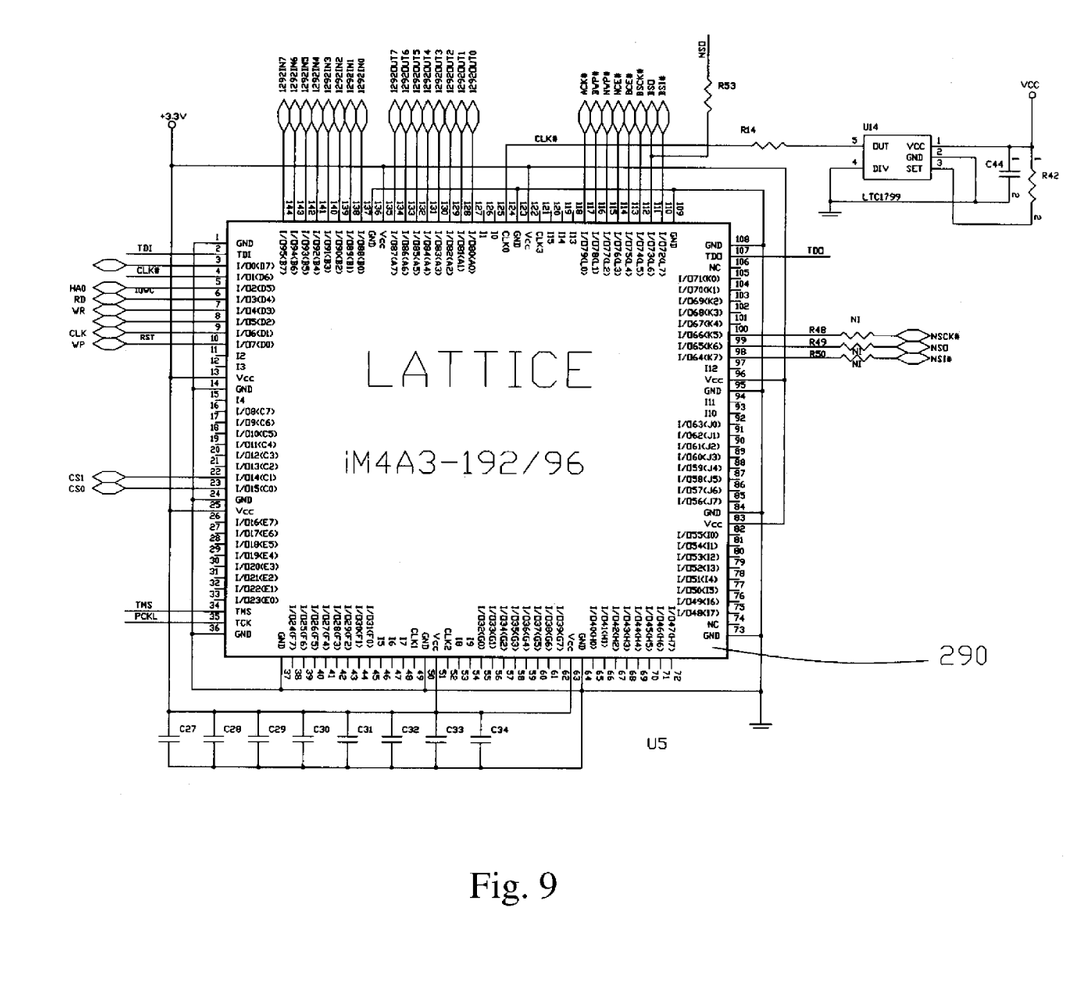
FIG. 9 is a circuit diagram of the data transforming circuit in accordance with the present invention.

Pins 14 (RD) and 1 (WR) of the parallel connector 210 are respectively connected to pins 6 (RD) and 7 (WR) of the data transforming circuit 290, for controlling to read or write the burn data in the burning process. Pin 17 of the parallel connector 210 is connected to a phase inverter 211 (FIG. 5). A signal from the phase inverter 211 is input into a bumper 212 to produce two reset signals. The two reset signals are respectively input into pin 10 of the BIOS connector 201 and pin 10 of the network card connector 202 (FIG. 7). The data control circuit 280 (FIG. 8) is connected to the IDE connector 220 for reading and controlling burn data from the burning machine 100. Simultaneously, pin 23 of the IDE connector 220 outputs a data controlling signal (IOWC) to pin 47 of the data control circuit 280, for controlling the data control circuit 280 to receive burn data from the burning machine 100. Pins 6, 5, 4, 3, 67, 66, 65, and 64 of the data control circuit 280 are respectively connected to pins 137, 138, 139, 140, 141, 142, 143, and 144 of the data transforming circuit 290 for transferring burn data thereto. Pins 14, 13, 12, 11, 10, 9, 8, and 7 of the data control circuit 280 are respectively connected to pins 127, 128, 129, 130, 131, 132, 133, and 134 of the data transforming circuit 290, for reading the burn data back to the burning machine 100 for verification after the burning process is finished. Simultaneously, pins 61 (WP) and 63 (CS) respectively output a write-protecting control signal (WP) and a selection control signal (CS) to pin 10 and pins 22, 23. The selection control signal is used to control the burning machine 100 to burn the chip being chosen. The write-protecting signal is used to protect the information of the chip from being modified when verifying the burning result. The burn data output from the pins 110 and 98 of the data transforming circuit 290 are respectively isolated by isolation circuits 291 and 292, to prevent interference from other circuits corrupting the burn data. The burn data being isolated is respectively sent to pin 2 of the BIOS connector 201 (BSI) and pin 2 of the network card connector 202 (NSI), and is respectively written into the corresponding chip. Pins 111 and 99 of the data transforming circuit 290 are respectively connected to pin 4 of the BIOS connector 201 (BSO) and pin 4 of the network card connector 202 (NSO), for reading the burned data from the chosen chip and sending the burned data back to the burning machine 100 via the data-transfer channel for verifying.

In the above-mentioned burning apparatus 200, the signal controlling function of the parallel connector 210 and the data-transferring function of the IDE connector 220 can be integrated in a single connector. The parallel port 102 and the IDE port 103 of the burning machine 100 can also be integrated in a single port connected to the integrated connector. The integrated connector synchronously receives burning data and controlling signals from the burning machine 100 via the integrated port.

The burning apparatus according to the present invention can also burn other types of chip analogous with the BIOS chip 201 and network card chip 202. When burning other chips, it is only needed to replace the BIOS connector and network card connector with other connectors corresponding to the burning chips, and controlling the burning machine 100 to output corresponding burning data to the chips to be burned.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A burning apparatus for burning data stored in a burning machine to a chip, comprising:
   a power transforming circuit for providing a working voltage to the chip;
   a first connector for receiving parallel burning data and control signals from the burning machine;
   a data transforming circuit for transforming the parallel burning data received from the burning machine into serial data and sending the transformed serial data to the chip;
   a second connector connected to the chip for sending the burn data output from the data transforming circuit to the chip; and
   an isolation circuit directly connected between the data transforming circuit and the second connector for preventing interference between the burning machine and the chip;

wherein the isolation circuit comprises a first N-channel MOSFET and a second N-channel MOSFET, a gate of the first N-channel MOSFET is connected to a first voltage source via a first resistor, a drain of the first N-channel MOSFET is connected to a second voltage source via a second resistor, and a source of the first N-channel MOSFET is connected to ground; a gate of the second N-channel MOSFET is connected to the drain of the first N-channel MOSFET, a drain of the second N-channel MOSFET is connected to a third voltage source via a third resistor, and a source of the second N-channel MOSFET is connected to ground.

2. The burning apparatus as claimed in claim 1, further comprising a data control circuit connected between the first connector and the data transforming circuit, for selecting and controlling the burn data received from the burning machine.

3. The burning apparatus as claimed in claim 2, wherein the data control circuit outputs a selection control signal and a write-protect control signal, the selection control signal being used for controlling the burn of the chip being selected, and the write-protect control signal being used for write-protection of the chip being selected.

4. The burning apparatus as claimed in claim 2, wherein a voltage control circuit is disposed between the power transforming circuit and the chip, and the voltage control circuit is connected to the first connector.

5. The burning apparatus as claimed in claim 4, wherein the voltage control circuit is connected to the burning machine via the first connector for receiving parallel burning data from the burning machine.

6. The burning apparatus as claimed in claim 1, further comprising a detecting circuit and a trigger circuit both connected between the first connector and the power transforming circuit.

7. The burning apparatus as claimed in claim 1, wherein the first connector sends a read/write control signal to the data transforming circuit for controlling the data transforming circuit to read and write the burn data.

8. A burning method for burning data stored in a burning machine to a chip, comprising:
providing a power transforming circuit for providing a working voltage to the chip; providing a first connector for receiving parallel burning data and control signals from the burning machine;
providing a data transforming circuit for transforming the parallel burning data received from the burning machine into serial data and sending the transformed serial data to the chip;
providing a second connector connected to the chip for sending the burn data output from the data transforming circuit to the chip; and
providing an isolation circuit directly connected between the data transforming circuit and the second connector for preventing interference between the burning machine and the chip;
wherein the isolation circuit comprises a first N-channel MOSFET and a second N-channel MOSFET, a gate of the first N-channel MOSFET is connected to a first voltage source via a first resistor, a drain of the first N-channel MOSFET is connected to a second voltage source via a second resistor, and a source of the first N-channel MOSFET is connected to ground; a gate of the second N-channel MOSFET is connected to the drain of the first N-channel MOSFET, a drain of the second N-channel MOSFET is connected to a third voltage source via a third resistor, and a source of the second N-channel MOSFET is connected to ground.

9. The burning method as claimed in claim 8, further comprising the step of providing a data control circuit connected between the first connector and the data transforming circuit, for selecting and controlling the burn data received from the burning machine.

10. The burning method as claimed in claim 9, further comprising the step of outputting a selection control signal for controlling to burn the chip being selected and a write-protect signal for write-protection of the chip being selected.

11. The burning method as claimed in claim 9, further comprising the step of providing a voltage control circuit disposed between the power transforming circuit and the chip, and the voltage control circuit is connected to the first connector.

12. The burning method as claimed in claim 8, further comprising the step of providing a detecting circuit and a trigger circuit both connected between the first connector and the power transforming circuit.

13. The burning method as claimed in claim 8, further comprising the step of sending a read/write control signal to the data transforming circuit by the first connector for controlling the data transforming circuit to read and write the burn data.

14. The burning method as claimed in claim 8, wherein the data transforming circuit is complex programmable logic device chip.

15. The burning apparatus as claimed in claim 1, wherein the data transforming circuit is complex programmable logic device chip.

* * * * *